Figure 1:
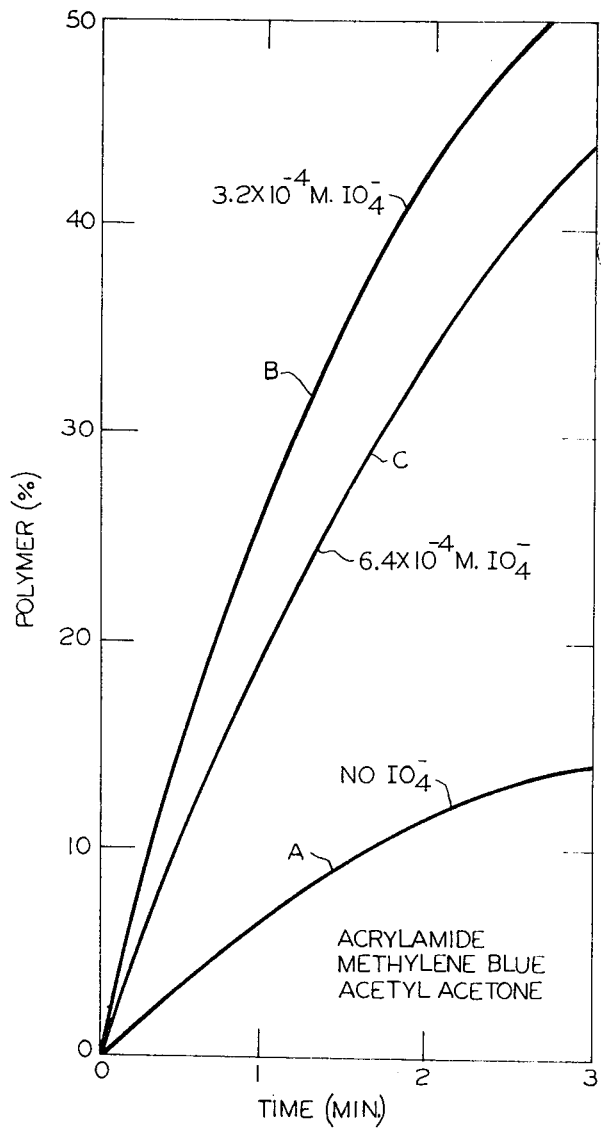
Figure 2:
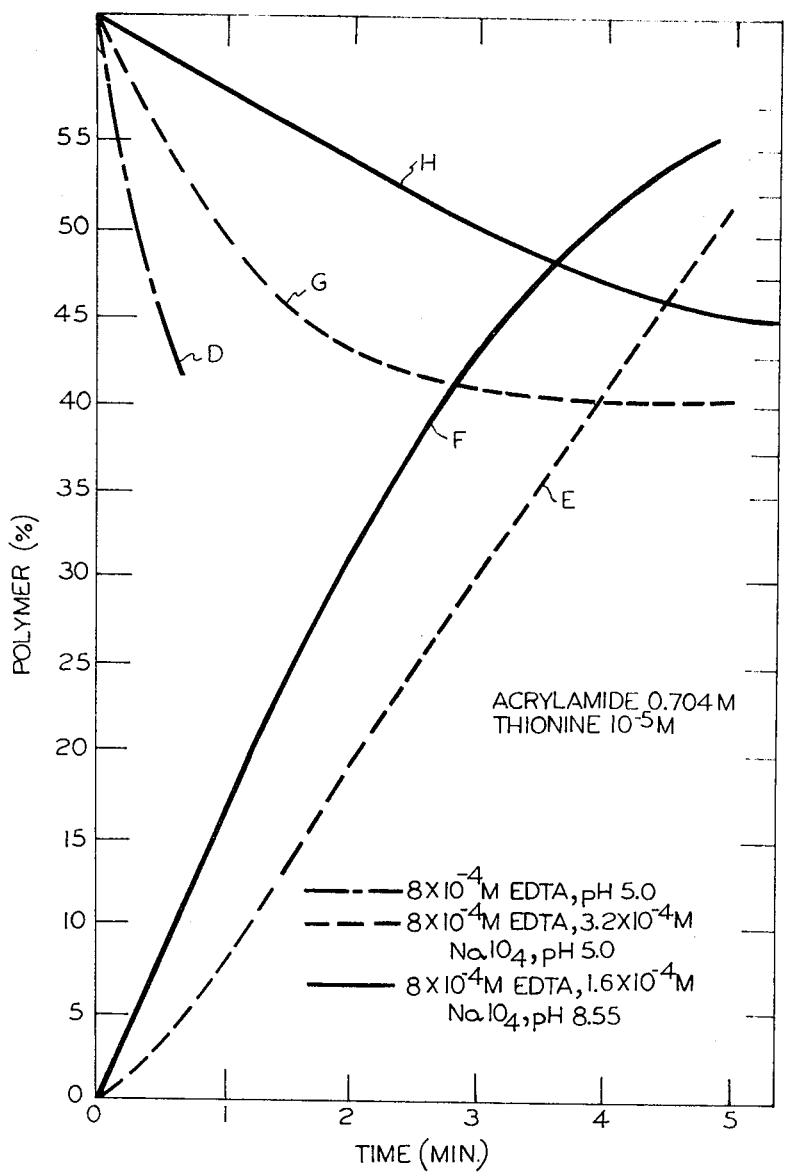
Figure 3:
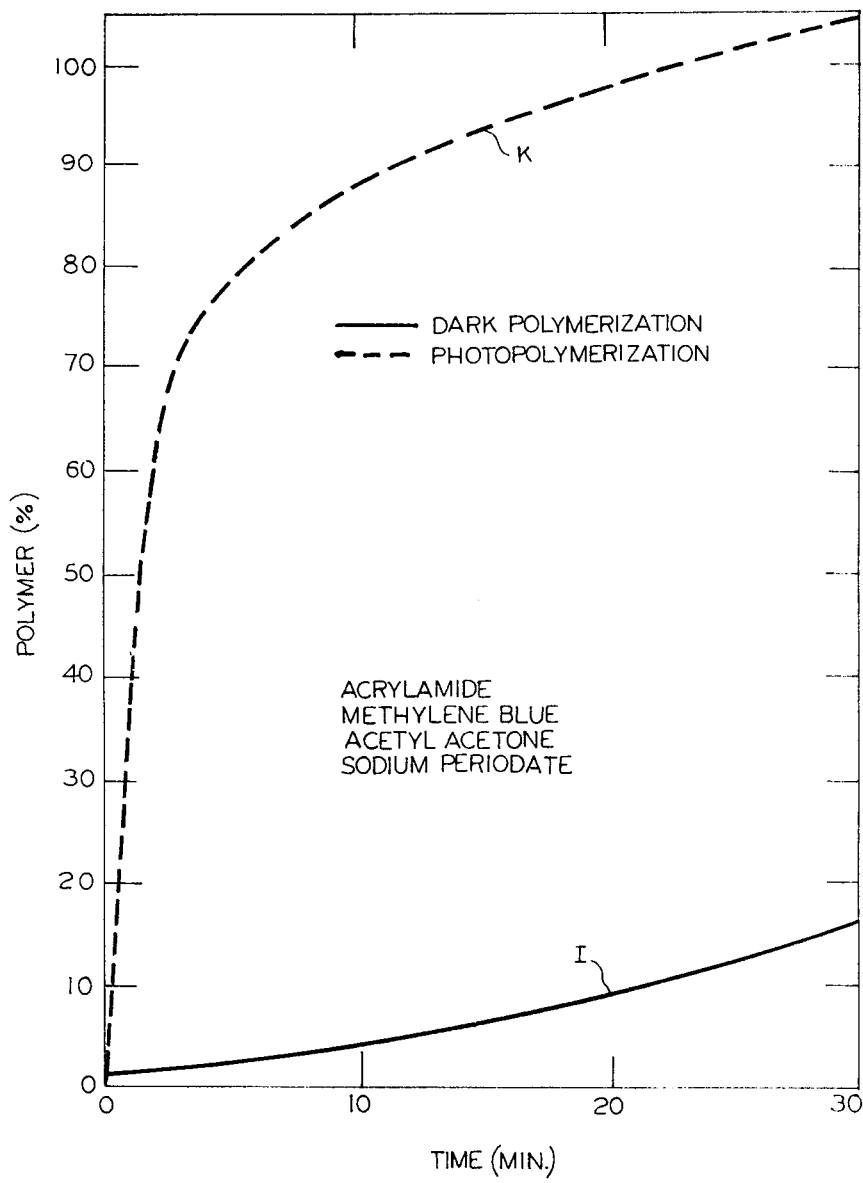
Figure 4:
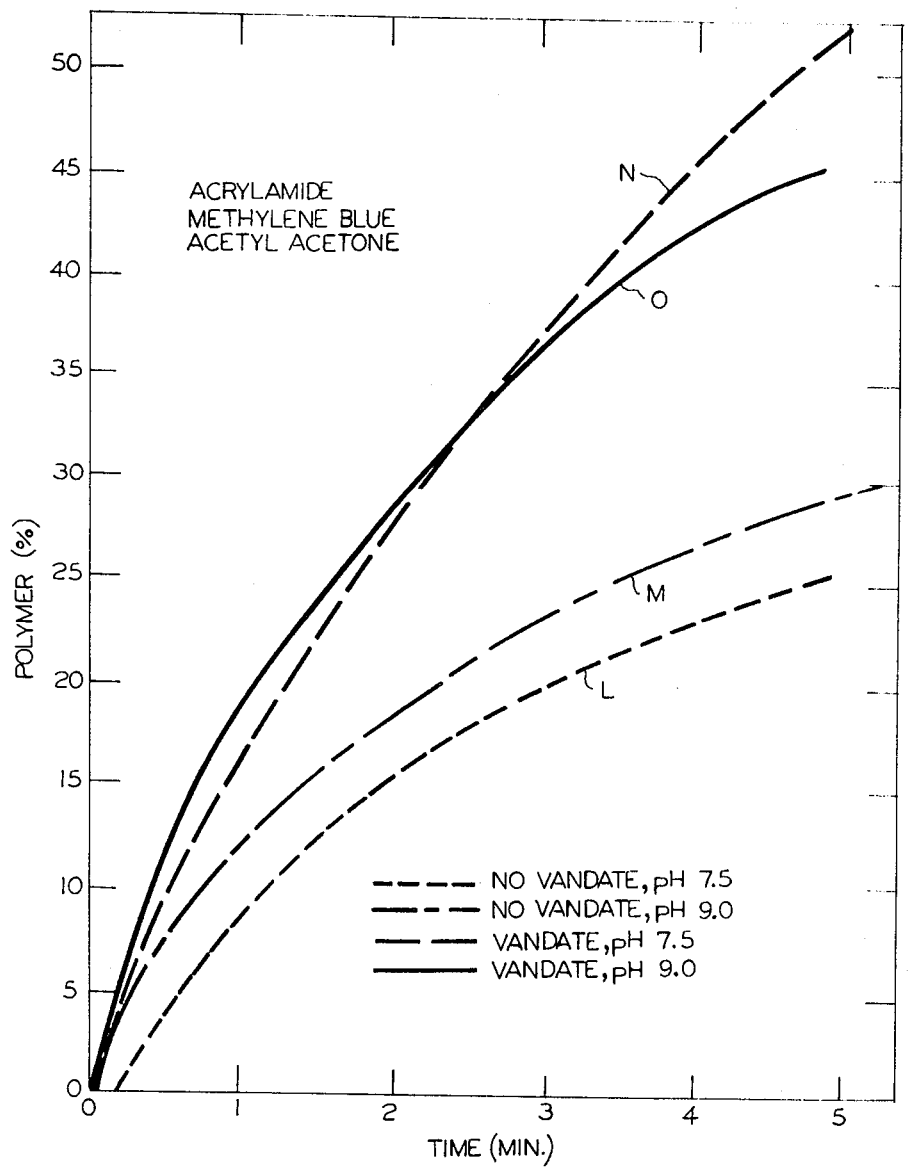

United States Patent

[11] 3,607,691

[72] Inventors Gershon M. Goldberg
Arlington;
Robert J. Allen, Saugus, both of Mass.
[21] Appl. No. 743,526
[22] Filed July 9, 1968
[45] Patented Sept. 21, 1971
[73] Assignee Technical Operations, Incorporated
Burlington, Mass.

[54] SYSTEM FOR THE REDOX PHOTOPOLYMERIZATION OF VINYL MONOMERS IN THE PRESENCE OF PERIODATES
15 Claims, 4 Drawing Figs.

[52] U.S. Cl. .................................................. 204/159.23,
96/115 P, 204/159.24, 260/89.7 R
[51] Int. Cl. .................................................. C08d 1/00,
C08f 1/16
[50] Field of Search ........................................ 204/159.23,
159.24

[56] References Cited
UNITED STATES PATENTS

| | | | |
|---|---|---|---|
| 2,989,455 | 6/1961 | Neugebauer et al. | 204/159.24 |
| 3,047,422 | 7/1962 | Sites et al. | 96/115 P |
| 2,729,624 | 1/1956 | Howard | 260/87.5 |

*Primary Examiner*—Murray Tillman
*Assistant Examiner*—Richard B. Turer
*Attorneys*—Boris Haskell and Alfred H. Rosen ABSTRACT: A visible light activated photopolymerization system is disclosed. The polymerization mixture contains a vinyl monomer, a reducible dye and reducing agent as the photopolymerization initiator, and a strong oxidizing agent. It is found that the presence of the strong oxidizing agent materially increases the rate of polymer formation over the same mixture in the absence of the strong oxidizing agent, particularly at the early stages of the photopolymerization reaction.

SYSTEM FOR THE REDOX PHOTOPOLYMERIZATION OF VINYL MONOMERS IN THE PRESENCE OF PERIODATES

The present invention relates to photopolymerization of unsaturated monomers which undergo polymerization via the formation of free radicals, and more particularly to enhancing the polymerization response of such systems to visible light excitation.

It is well known that polymerization of unsaturated monomers such as vinyl monomers, for example acrylamide, can be induced by visible light with a dye-redox initiator system comprising a reducible dye and an electron donor, such as a weak reducing agent as ethylene diamine tetra acetic acid (EDTA). The dye and electron donor are selected so that they do not react with each other in the dark; but when excited with light of a wavelength within the energy absorption band of the dye, the photoenergy absorbed by the dye renders the dye more easily reduced, so that it is capable of reacting with the electron donor component of the system to produce a free radical capable of initiating the monomer polymerization.

In general, this well-known type of dye-redox system of photopolymerization is considered applicable to the polymerizable vinyl compounds, particularly common examples of which are acrylamide, acrylonitrile, and the methacrylates, such as methyl methacrylate. Numerous types of dyes are reported as active in such a system, for example the xanthenes, acridines, thiazines, porphyrins and flavins. In addition to EDTA, mentioned above, other secondary and tertiary amines are generally suitable as electron donors in this redox initiating system.

More recently, it has been discovered that compounds containing a labile hydrogen atom in an active methylene or methine group, can be used as the electron donor compound in the dye-redox reaction. This discovery is set forth in the copending application of Robert J. Allen and Stanley Chaberek, Ser. No. 487,562, filed Sept. 15, 1965 now Pat. No. 3,488,269, wherein such compounds as the $\beta$-dicarbonyls, $\beta$-keton-itriles, and $\beta$-ketoimines are suggested as particularly advantageous.

The dye-redox system of photopolymerization using amines as the electron donor compound had generally been thought to require the presence of free oxygen to effect light induced polymerization of the monomer. In accordance, however, with the invention set forth in application Ser. No. 314,432, filed Oct. 7, 1963 now abandoned, by Robert L. MacNeil, Stanley Chaberek, and Alan Shepp, it was found that not only is oxygen unnecessary, but it is detrimental: and the same is true of the photopolymerization systems defined in said application Ser. No. 487,562. Photoinitiation of these types of dye-redox polymerization systems can be effected with no discernible induction period if carried out under anaerobic conditions. In the presence of oxygen, however, not only is a substantial induction period encountered before polymerization begins, but also it is found that the presence of oxygen decreases the polymer yield for a given time period and decreases the quantum efficiency of the photopolymerization reaction.

For anaerobic conditions, it is considered that an oxygen concentration of about 0.005 p.p.m. or less is optimum, while concentrations up to about 0.01 p.p.m. or somewhat higher appear not to affect the photopolymerization reaction very materially in some instances. Increasing oxygen concentrations do however tend correspondingly to decrease the polymer yields for a given time period, decrease the quantum efficiencies of the reactions, increase the induction periods before polymerization starts, or otherwise inhibit the polymerization reaction. As a further condition to effecting the foregoing advantages, it is found that the anaerobic dye-redox photopolymerization should in many instances preferably be conducted under slightly alkaline conditions, such as a pH of between about 8 and 10, and particularly at around 9.

To illustrate the effect of oxygen on the dye-redox system of photopolymerization, acrylamide monomer was polymerized by means of an initiator system comprised of thionine and nitrilotripropionamide (N - $(CH_2 CH_2 CO NH_2)_3$), activated by the application of visible light, including the 5,900 A absorption band of the thionine dye. The quantum efficiency of this reaction (molecules of polymer formed per photon of light absorbed) when conducted under anaerobic conditions was found to range between 0.01 and 0.3, while in the presence of oxygen it was only 0.01–0.02. In addition, with an oxygen concentration of only $10^{15}$ M as compared with preferred anaerobic conditions, the percent of polymer yield of the oxygen containing reaction was down between about one-half and one-third, after between 4 to 8 minutes, from the corresponding anaerobic reaction; and whereas the anaerobic reaction showed no induction period, the presence of the small trace of oxygen caused an induction period of over three minutes.

It has been further found, as set forth in the copending application of Stanley Chaberek and Robert J. Allen Ser. No. 314,433, filed Oct. 7, 1963, that the efficiency of the visible light induced dye-redox polymerization reaction can be further enhanced by the addition to the system of a relatively mild oxidizing agent. Peroxides are suggested as particularly useful. It appears that the oxidizing agent functions to oxidize the reduced dye back to its photoactive state, and thereby perpetuate the polymerization reaction. The effect of the oxidant is therefore had primarily in later stages of the polymerization reaction.

It is apparent that the increased efficiencies and polymer yields obtained from the invention of the applications referred to above are useful economic improvements in producing light induced polymerization. The same is also true of the saving in time affected by elimination of the induction period. The elimination of the induction period is of course also particularly useful in applying the present type of system to photographic recording through photopolymerization.

In accordance with the present invention, it has been discovered further that the visible light induced polymerization efficiency of the vinyl monomer, reducible dye and electron donor systems can be significantly improved by the inclusion of a strong oxidizing agent in the reaction system. In particular, it has been found that periodates and vanadates are singularly useful for this purpose; however, other strong oxidizing agents are likewise effective, as will be apparent to those skilled in the art from the subsequent detailed description and explanation of the invention.

Whereas the presence of a weak oxidizing agent in these reaction systems produces enhanced polymerization in the later stages of the reaction, the presence of a strong oxidizing agent, it is found, also provides a great increase in the rate of polymerization at the very outset of the polymerization reaction. For example, in one system using acrylamide as the monomer, methylene blue as the dye, and acetyl acetone as the electron donor, in the presence of periodate ion over 50 percent of the monomer had been converted to polymer in less than three minutes; whereas in a comparable run, in the absence of periodate less than 15 percent of the monomer had been converted to polymer in three minutes of reaction. It has been observed that the improved results of the present invention are applicable to the various dye-redox initiator systems discussed above, such as those using amines, and those using labile hydrogen methylene or methine group containing compounds, as electron donors. Also, the invention is applicable to various free radical polymerizable monomers, such as acrylamide, acrylic acid and its salts, methacrylates, vinyl ketones, vinyl pyridines etc.

It is accordingly one object of the present invention to provide an improved visible light induced polymerization system.

Another object of the present invention is to provide an improved free radical type, visible light induced photopolymerization system.

Another object of the present invention is to provide such a system utilizing a dye-redox initiator in combination with a strong oxidizing agent, such as a periodate or a vanadate.

Another object of the present invention is to provide such a system as applied to polymerizable vinyl compounds.

Another object of the present invention is to provide such a system wherein there is essentially no induction period.

And still another object of the present invention is to provide such a system embodying substantially improved polymerization efficiency, particularly in the beginning stages of the polymerization reaction.

Other objects and advantages of the present invention will become apparent to those skilled in the art from a consideration of the following detailed specific examples of the present invention, had in conjunction with the accompanying drawings. These drawings, presented as FIGS. 1, 2, 3 and 4, are graphic representations of the polymerization results obtained with a number of the specific examples hereinafter described.

In each of the following examples, the photopolymerization was conducted in a glass vessel, in water solution, at room temperature, and buffered to the pH value indicated, such as by the use of a phosphate buffer or the like. The polymerization system was made up by adding monomer, electron donor or reducing agent for the dye-redox reaction, and the strong oxidizing agent, to the extent each is employed, to the buffer solution, and finally adding dye from a stock solution. The reaction mixture was shielded from ambient light. After addition of the dye, anaerobic conditions of between about 0.01 to 0.005 p.p.m. of oxygen were obtained (unless otherwise indicated) by purging each solution with helium scrubbed free of oxygen, requiring about two hours of rapid purge per 100 ml. of solution. After purging, the reaction vessel was irradiated with light consisting essentially only of wavelengths in the visible band. The light source was a 350 watt stabilized projection lamp run at 80 volts. The light output of the lamp was appropriately filtered to cut off any ultraviolet, and except where otherwise stated, a Wratten 23A filter was used, which cuts out light below 570 $\mu$. Samples of reaction solution were withdrawn periodically and the concentration of polymer determined. In each example the polymer samples showed an average molecular weight in the range of about $2 \times 10^6$.

EXAMPLES I, II and III

An anaerobic (i.e., between about 0.01 and about 0.005 p.p.m. or less oxygen) polymerization was conducted utilizing the following reaction formulation as Example I:

| acrylamide | 0.704 M |
| methylene blue | $10^{15}$ M |
| acetyl acetone | $8 \times 10^{15}$ M |
| pH | 9. |

The percent polymer yield is plotted against time as curve A in FIG. 1.

Equivalent anaerobic polymerizations were conducted with the same reaction formulation as set forth in Example I, except for Example II the formulation further included $3.2 \times 10^{14}$ M sodium periodate, and for Example III $6.4 \times 10^{14}$ M sodium periodate. The plot of percent polymer yield for example II is set forth as curve B in FIG. 1, and the plot for Example III is set forth as curve C in FIG. 1.

Other runs containing from, $0.8 \times 10^{14}$ to $6.4 \times 10^{14}$ M sodium periodate provided polymerization yield curves lying between curves B and C. It will be observed from FIG. 1 that after 1 minute of polymerization the yield for the reaction of curve B with periodate was about five times that of curve A with no periodate, and that after 3 minutes of polymerization the polymer yield for the reaction of curve B was approximately four times that of curve A.

EXAMPLES IV AND V

An anaerobic polymerization was conducted utilizing the following reaction formulation as Example IV:

| acrylamide | 0.704 M. |
| Thionine | $8 \times 10^{15}$ M. |
| Ethylenediaminetetraacetic acid | $8 \times 10^{14}$ M. |
| pH | 5 |

No polymer was detected in the 5 minute period of the reaction run.

Equivalent anaerobic reactions were conducted as Examples VII and VIII, except that in Example VII the reaction mixture also contained $3.2 \times 10^{14}$ M sodium periodate, and in Example VIII the reaction mixture contained $1.6 \times 10^{14}$ M sodium periodate and the pH was adjusted to 8.55. The percent polymer yield and the changes in dye concentrations for these examples are plotted against time in FIG. 2. Curve D shows the rapid decrease in dye concentration for Example VI (i.e., photoreduction of the dye) which probably accounts for the failure of this reaction mixture to produce any polymer. Curve E shows the high rate of polymer generation in Example VII, and curve F shows a still higher rate for Example VIII. Curves G and H are the dye concentration curves for Examples VII and VIII, respectively.

In additional studies of the effect of periodate on the dye-redox photopolymerization of vinyl monomers, it was found that at high concentrations of acetyl acetone and at low concentrations of oxygen in the reaction system, in the presence of periodate, the vinyl monomer polymerizes at a slow rate in the dark, without photoinitiation. Utilizing a reaction mixture of 0.704 M acrylamide, $10^{15}$ M methylene blue, and $1.6 \times 10^{14}$ M sodium periodate, it was observed that with concentrations of $0.8 \times 10^{14}$ and $1.6 \times 10^{14}$ M acetyl acetone, no dark polymerization was detected after a 2 hour purge with scrubbed helium—i.e., the condition herein referred to as anaerobic. However, at concentrations of $2.4 \times 10^{14}$ to $3.2 \times 10^{14}$ M acetyl acetone, dark polymerization was detected when the oxygen level was brought down to about 0.8 p.p.m. At an acetyl acetone concentration of $6.4 \times 10^{14}$ M., dark polymerization was observed when the oxygen level of the reaction mixture reached 1.4 p.p.m.

EXAMPLES IX AND X

To illustrate the foregoing phenomenon, the following formulation was used as the polymerization reactive mixture for Examples IX and X:

| acrylamide | 0.704 M. |
| methylene blue | $1^{15}$ M. |
| acetyl acetone | $3.2 \times 10^{14}$ M. |
| sodium periodate | $1.6 \times 10^{14}$ M. |

For example IX, the dark polymerization reaction was studied as a function of time. The solution was purged with oxygen free helium and sampled until polymer was detected, and this was taken as the zero time point. Purging and sampling were continued in the dark for a period of 30 minutes, and the percent polymer is plotted against time as curve I in FIG. 3. A second sample of this reaction mixture, Example X, was purged to the point where spontaneous or dark polymerization was first detected, and then it was illuminated in the manner of the other photopolymerization reactions described herein. The percent polymer yield is plotted against time as curve K in FIG. 3. It will be observed that the initial rate of photopolymerization is sixty times higher than the initial rate of the dark reaction.

This phenomenon affords a novel vehicle for use of the reaction in photographic recording. By distributing the reaction mixture of Examples IX and X in a gel or like layer and purging the material to an oxygen level just above the threshold value for dark polymerization, the layer will be stable in the dark. When selectively exposed to light, the dye in the exposed area is converted to the leuco form, which is an oxygen scavenger, thereby reducing the oxygen content in the exposed areas to a value below the threshold concentration, whereby a dark polymerization will be induced in such exposed areas to provide a record of the light struck areas.

The effect of the oxidizing agent in the foregoing examples is had only in connection with the dye-redox initiator system, as a device for enhancing the effects thereof and the response of the system to visible light. Under the conditions of operation, the oxidizing agent alone does not have any perceivable direct effect on the initiation of photopolymerization of the vinyl monomer. This conclusion is based upon efforts to effect photopolymerization of the monomer simply in the presence of sodium periodate. Attempts to induce photopolymerization of a mixture of 0.704 M. acrylamide and $1.6 \times 10^{14}$ M sodium periodate in accordance with the foregoing procedures produced no indication of polymer formation within the 5 minute illumination period normally employed in the preceding examples, and this was true despite use of a Corning 3391 light filter to give a broader spectrum of illumination than in the preceding examples. The Corning 3391 light filter cuts out wavelengths below 395 $\mu$, as distinguished from the Wratten 23A filter used in the other examples, which cuts out wavelengths below 570 $\mu$.

Although each of the preceding specific examples uses periodate ion as the strong oxidizing agent, other strong oxidizing agents may also be used; and although the preferred pH of the reaction mixture is about 9, other values may also be employed within the scope of the present invention. These conclusions are substantiated by the following illustrative examples.

EXAMPLES XI, XII, XIII and XIV

For this series of examples the periodate ion is replaced with vanadate ion; and the Wratten 23A light filter is replaced with the Corning 3391 filter. The vanadate content of the reaction mixture was obtained by saturating a 4 percent aqueous acetyl acetone solution with sodium metavanadate above room temperature, and allowing the solution to cool to room temperature. To simulate the effect of hydrolysis of acetyl acetone, one drop of acetic acid and one drop of acetone were added. The solution was then filtered free of undissolved vanadate.

The control reaction mixture comprised:

| | |
|---|---|
| acrylamide | 0.704 M |
| methylene blue | $2 \times 10^{15}$ M |
| acetyl acetone | $4 \times 10^{13}$ M |

Anaerobic photopolymerization of one control mixture as Example XI was had at pH 7.5, while that of another, Example XII, was had at pH 9.0. Plots of the percent polymer against time are presented in FIG. 4 as curves L and M, respectively.

Comparable vanadate ion containing anaerobic photopolymerization reactions were obtained as Examples XIII and XIV, by using aliquotes of the above-described vanadate saturated 4 percent acetyl acetone solution in amounts required to provide the $4 \times 10^{13}$ M concentration of acetyl acetone. The results of these photopolymerization reactions are shown as curves N and O in FIG. 4, being run at pH's 7.5 and 9.0, respectively. A comparison of curves L and M with curves N and O quickly reveals that the presence of vanadate ion in the photopolymerization mixture results in substantially increased rates of polymerization.

Having thus described the present invention, and illustrated the same by means of preferred specific examples, it should be understood that the invention is not intended to be limited to these examples, but that the purview of the invention is intended to be defined by the spirit and scope of the appended claims.

What is claimed is:

1. The method of photopolymerizing a monomer compound of the type which can undergo polymerization via the formation of free radicals, comprising exposing to light having a spectral distribution consisting essentially of wavelengths in the visible portion of the spectrum, a mixture containing said monomer compound, a reducible dye, an electron donor compound, and periodate ions as an oxidizing agent, said light containing within its spectrum wavelengths within the energy absorption band of said dye, said dye and electron donor compound being substantially nonreactive in the absence of said light but reactive in the presence thereof to produce free radicals for initiating the polymerization of said monomer compound.

2. A method as set forth in claim 1, wherein said mixture is substantially anaerobic.

3. A method as set forth in claim 2, wherein said monomer compound is a vinyl compound.

4. A method as set forth in claim 3, wherein the oxygen concentration of said mixture is less than about 0.1 p.p.m.

5. A method as set forth in claim 4, wherein said oxygen concentration is less than about 0.005 p.p.m.

6. A photopolymerization reaction mixture comprising a monomer compound of the type which can undergo polymerization via the formation of free radicals periodate ions as an oxidizing agent, and a photopolymerization initiator system for said monomer compound comprising a reducible dye and an electron donor compound, said dye and electron donor compound being substantially nonreactive in said mixture in the dark but reactive in the presence of visible light containing wavelengths within the energy absorption band of said dye to produce free radicals to initiate a polymerization reaction of said monomer.

7. A mixture as set forth in claim 6, wherein said electron donor compound is acetyl acetone present in amount of at least approximately $2 \times 10^{14}$ M, and said mixture contains more than 0.1 p.p.m. of oxygen dissolved therein, whereby the exposure of said mixture to light effects a reduction in the oxygen concentration to induce polymerization of said monomer.

8. A mixture as set forth in claim 8, wherein said mixture contains at least about 0.8 p.p.m. of oxygen dissolved therein.

9. A mixture as set forth in claim 6, wherein said monomer is a vinyl compound.

10. A mixture as set forth in claim 6, which is substantially anaerobic.

11. A mixture as set forth in claim 10, wherein said monomer is a vinyl compound.

12. A mixture as set forth in claim 6, wherein said monomer is a vinyl compound.

13. A mixture as set forth in claim 6, wherein said electron donor compound is acetyl acetone.

14. A mixture as set forth in claim 6, wherein said monomer is a vinyl compound, and said electron donor compound is acetyl acetone.

15. A mixture as set forth in claim 15, wherein said vinyl compound is acrylamide.